UNITED STATES PATENT OFFICE.

FRANZ PIRSCHL, OF BROOKLYN, NEW YORK.

PROCESS OF MAKING RESINATES OF METALS.

SPECIFICATION forming part of Letters Patent No. 521,270, dated June 12, 1894.

Application filed December 15, 1891. Renewed March 26, 1894. Serial No. 505,196. (No specimens.)

*To all whom it may concern:*

Be it known that I, FRANZ PIRSCHL, a subject of the Emperor of Austria-Hungary, and a resident of Brooklyn, in the county of Kings and State of New York, have invented certain new and useful Improvements in Processes of Making Resinates of Metals, of which the following is a specification.

This invention has reference to an improved process of making resinates of metals by the dry process in such a manner that saturated combinations are obtained, which have to a higher degree than similar combinations heretofore produced, the property of resisting the influence of moisture, acids and alkalies.

Resinates of metals were heretofore produced in two different ways, first, by the wet process, in which the abietic acid of the rosin is saponified with an alkali and then the combination with the water-soluble salt of a metal is produced; or, secondly, by the dry process, in which rosin is melted and mixed with a metallic oxide or hydrated oxide. By the latter process the abietic acid contained in the rosin is only capable of absorbing a comparatively small percentage of the metallic oxide, while a considerable quantity of free abietic acid remains in the combination without combining with the oxide. This impairs the value of the different metallic resinates when used in the arts, as for instance in their admixture with varnishes, lacquers, coloring material used for printing on textile fabrics, or when used as a filler for wood, wood-pulp, insulating-material, &c.

The object of my invention is to furnish an improved process of forming resinates of metals by the dry process in such a manner that a much greater percentage of the metals is combined with the abietic acid than was possible heretofore, whereby valuable properties are imparted to said resinates and their application in the arts rendered more extensive.

My process is based on the observation made by a series of experiments that by the presence of a suitable flux during the formation of the resinates of the metals a more saturated combination is obtained; and my invention consists of the process of making resinates of metals by melting rosin and adding a metallic oxide or a hydrated metallic oxide in presence of a flux, such as rosin-oil until a saturated combination of the metal with the oxide is obtained.

In carrying out my process, the time used for melting the substances together, as well as the temperature at which the combination of the substances occurs differ according to the metallic oxides employed. The combination of the abietic acid with metallic oxides takes place in different proportions, the resulting resinates differing essentially in their properties. By melting for instance one hundred pounds of rosin and adding to the liquefied rosin ten pounds of a fluxing substance, such as rosin-oil, it will enable the abietic acid contained in the rosin to absorb up to eight pounds of calcium oxide or hydrated calcium-oxide. The hydrated metallic oxides are preferably used for the reason that the oxide is contained in the same in a more minute condition than by use of the oxides themselves. By melting the abietic acid and the hydrated calcium-oxide together, the latter is decomposed into its oxide and water, which is liberated by evaporation. In this manner a saturated combination of abietic-acid and calcium-oxide is obtained without leaving free abietic acid in the mass inasmuch as all or nearly all of its weight of the acid is combined with the base. By carrying out the same process in regard to other metallic oxides, I have found that abietic acid will absorb up to sixteen per cent. of manganese-dioxide; up to ten per cent. of barium-oxide; up to forty per cent. of the oxide of lead, and from two per cent. upward of the oxides of iron, copper and zinc.

The advantages of using rosin-oil as a flux, arise from the fact that the same being a derivative of the rosin, with a natural affinity for the same, keeps thé abietic acid in the rosin in liquid condition, so as to enable it to absorb and retain a comparatively larger quantity of the metallic oxide, while it also imparts to the resinates a greater resistance to alkalies and other chemical agencies.

The different combinations between the metallic oxides and abietic acid, as described, are soluble in benzine, turpentine and oils, and can be utilized in the manufacture of varnishes and lacquers, so as to impart to them greater resistance to water, acids and alkalies. They can also be used to great advantage for insulating purposes in admixture with other materials, such as with colors used for printing on textile fabrics, in the manufacture of india rubber, for water-proofing, articles of wood, wood-pulp and for other applications in the arts.

Having thus described my invention, what I claim as new, and desire to secure by Letters Patent, is—

1. The process herein described of making resinates of metals, which consists in fusing rosin with a metallic oxide in the presence of a flux composed of rosin-oil, substantially as set forth.

2. The process herein described of making resinates of metals, which consists in fusing rosin and adding a hydrated metallic oxide in presence of a flux composed of rosin-oil, substantially as set forth.

In testimony that I claim the foregoing as my invention I have signed my name in presence of two subscribing witnesses.

FRANZ PIRSCHL.

Witnesses:
PAUL GOEPEL,
CHARLES SCHROEDER.